United States Patent [19]

Fujii et al.

[11] 4,174,786
[45] Nov. 20, 1979

[54] SEAL MEMBER FOR CONNECTING MASTER CYLINDER AND RESERVOIR

[75] Inventors: Takashi Fujii; Jiro Kizaki, both of Toyota, Japan

[73] Assignees: Aisin Seiki Kabushiki Kaisha, Kariya; Toyota Jidosha Kogyo Kabushiki Kaisha, Toyota, both of Japan

[21] Appl. No.: 899,821

[22] Filed: Apr. 25, 1978

[30] Foreign Application Priority Data

Apr. 25, 1977 [JP] Japan .................................. 52-47525

[51] Int. Cl.² ........................ F16J 15/32; B65D 53/02
[52] U.S. Cl. .................................. 220/378; 277/205; 277/207 R
[58] Field of Search ................... 277/205, 206, 206 A, 277/207 R; 220/378

[56] References Cited

U.S. PATENT DOCUMENTS

| | | | |
|---|---|---|---|
| 1,817,870 | 8/1931 | Bille' | 277/206 X |
| 2,470,925 | 5/1949 | Fredrickson | 277/205 X |
| 3,036,846 | 5/1962 | Peras | 277/59 |
| 3,047,301 | 7/1962 | Taylor et al. | 277/206 A X |
| 3,325,174 | 6/1967 | Weaver | 277/209 X |

FOREIGN PATENT DOCUMENTS 911596 11/1962 United Kingdom ................ 277/206 A
1096007 12/1967 United Kingdom ..................... 220/378

Primary Examiner—Robert S. Ward, Jr.
Attorney, Agent, or Firm—Finnegan, Henderson, Farabow & Garrett

[57] ABSTRACT

A seal member for a fluid-tight connection of a plastic reservoir and a metal cylinder having different thermal expansion coefficients, including one end portion in sealing contact with each connecting portion of the reservoir and the cylinder, a middle portion formed integrally with and contiguous to the one end portion, the middle portion being normally separated from either one or both connecting portions of the reservoir and the cylinder and another end portion formed integrally with and contiguous to the middle portion and in sealing contact with both connecting portions of the reservoir and cylinder, wherein the middle portion of the seal member and the corresponding connecting portions of the reservoir and cylinder will not be influenced by thermal stress even when the surrounding temperature thereof may increase.

6 Claims, 2 Drawing Figures

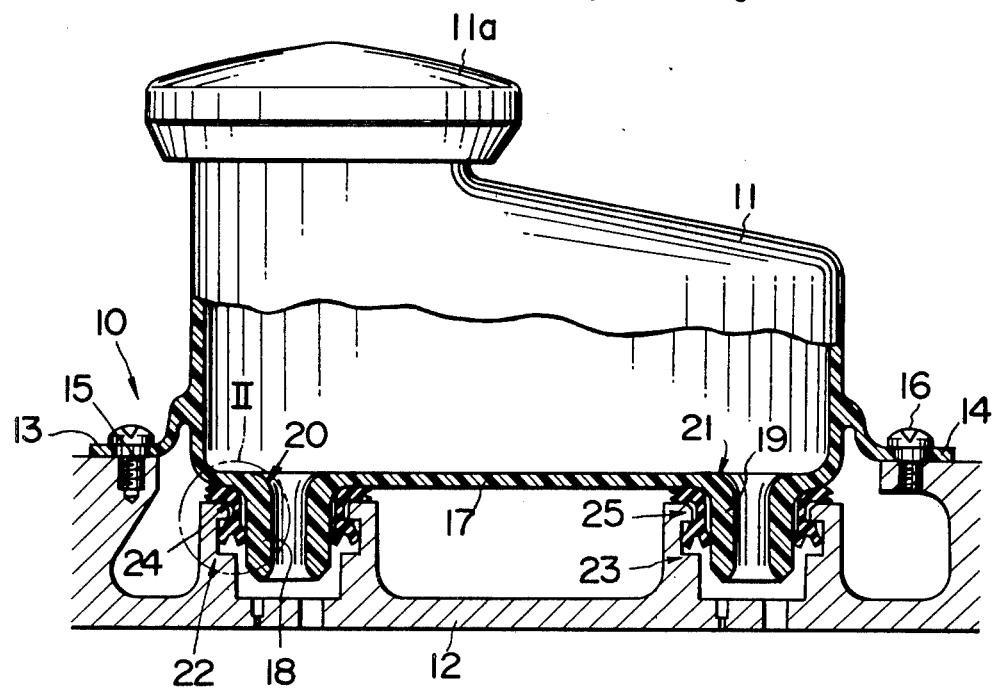
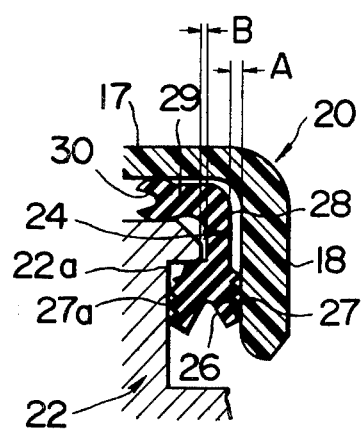

SEAL MEMBER FOR CONNECTING MASTER CYLINDER AND RESERVOIR

BACKGROUND OF THE INVENTION

1. Field of the Invention

This invention relates generally to a seal member interposed between two elements for maintaining fluid-tight connection therebetween, and more particularly to a seal member adapted to be used for a fluid-tight connection between a plastics reservoir and a metal cylinder body.

2. Description of Prior Art

Recently, in order to reduce the weight of a master cylinder assembly, the reservoir portion thereof has been made of plastic material. However, since the cylinder body has to be made of a metal material such as cast iron or aluminum for functional reasons, the two portions having different thermal expansion coefficients must be connected to each other to form a master cylinder assembly. Due to the difference of their thermal expansion coefficients, it is difficult to maintain the fluid-tight connection between the reservoir and cylinder body portions, that is, when the temperature surrounding the master cylinder rises, the plastic reservoir, having a relatively high thermal expansion coefficient, will expand at a greater rate than the metal cylinder having a relatively low thermal expansion coefficient. This results in deformation of the connecting portion of the reservoir and cylinder even if they have been properly connected to each other on assembly.

In order to obviate such a drawback, one improvement has been proposed, wherein a grommet type seal member is inserted between a plastic reservoir and metal cylinder so as to absorb the excess expansion therebetween (British Pat. No. 1,096,007 published on Dec. 20, 1967).

It should be noted, however, that such resilient seal members as rubber or resilient plastics also have high thermal expansion coefficients. Thus, when the grommet type seal member with its entire peripheral (outer and/or inner) surfaces, in sealing contact with the connecting portion of the reservoir and cylinder body is subject to high temperatures, a great deal of thermal stress will be generated at the connecting portion, thereby deforming the plastic reservoir as well as the seal member itself, resulting in a critical defect in the sealing function.

SUMMARY OF THE INVENTION

It is, therefore, an object of the present invention to provide an improved seal member inserted between two elements having different thermal expansion coefficients.

It is a further object of the present invention to provide an improved seal member adapted to be used for a fluid-tight connection between a plastic reservoir and a metal cylinder.

It is a still further object of the present invention to provide an improved seal member having a high degree of reliability in function and durability in use.

According to the present invention, a seal member for the fluid-tight connection of two elements having different thermal expansion coefficients is provided, wherein both ends of the seal member are in sealing contact with the respective elements to enable the sealing function therebetween while the middle portion of the seal member is normally separated from the corresponding connection portions of the two elements so as to reduce the thermal stress generated when the seal member and plastic reservoir expand in accordance with the increase in the surrounding temperature thereof.

BRIEF DESCRIPTION OF THE DRAWINGS

The above and other objects and features of the present invention will become apparent from the following descriptions of a preferred embodiment having reference to the accompanying drawings, in which;

FIG. 1 is a partial cross-sectional view of a brake master cylinder assembly including seal members of the present invention; and FIG. 2 is an enlarged partial view of the portion II of FIG. 1.

DESCRIPTION OF THE PREFERRED EMBODIMENT

Referring now to the attached drawings, the numeral 10 designates a brake tandem master cylinder which generally comprises a reservoir 11 made of plastic material, such as nylon or polypropylene, and a cylinder body 12 made of metal, such as cast iron or cast aluminum.

The reservoir 11 includes a front chamber portion (left side in FIG. 1) and a rear chamber portion and is closed by a detachable cap 11a. In this embodiment both chambers communicate with each other without any partition wall therebetween. Each front and rear chamber portion has a cylindrical downward extension 18 or 19 depending from a common bottom 17 of the reservoir 11. The two downward extensions 18 and 19 serve as attachments of the reservoir 11 to the cylinder body 12. Similarly, a pair of cylindrical upward extensions 22 and 23 are provided on the cylinder body 12 for receiving the downward extensions 18 and 19 through rubber-like, resilient seal rings 24 and 25, respectively.

A pair of flanges 13, 14 are provided at the front and rear end portions of the reservoir 11 for securing the reservoir 11 to the cylinder body 12 with bolts 15 and 16, respectively.

Brake fluid in the reservoir 11 is supplied to pressure chambers (not shown) in the cylinder body 12 through the interiors of the downward extensions 18, 19 and the upward extensions 22, 23.

An attachment structure 20 of the reservoir 11 to the cylinder body 12 will be explained in detail with reference to FIG. 2. The seal ring 24 is disposed between the downward extension 18 of the reservoir 11 and the upward extension 22 of the cylinder body 12 for effecting a fluid-tight connection therebetween. The seal ring 24 includes a thick lower portion 27, a thin middle portion 28 integral with and contiguous to the thick lower portion 27 and a thick upper portion 29 integral with and contiguous to the thin middle portion 28. The inner periphery of the thick lower portion 27 is in sealing contact with the outer peripheral surface of the downward extension 18, while the outer periphery of the thick lower portion 27 is in sealing contact with the inner peripheral surface of the upward extension 22 so that the brake fluid in the reservoir 11 and the cylinder body 12 may be prevented from leaking out. The thick lower portion 27 of the seal ring 24 is further provided with an annular groove 26 at the lowermost end thereof. The thick upper portion 29 extends outwardly to be in sealing contact with the undersurface of the bottom 17 of the reservoir 11 and the upper surface of the upward extension 22 of the cylinder body 12 for preventing entry of external objects such as water or dust. The thick upper portion 29 is also provided with an annular groove 30 at the outermost end thereof.

The thin middle portion 28 of the seal ring 24 is positioned between the outer periphery of the downward extension 18 and the inner periphery of the upward extension 22 in spaced relation thereto (having a gap A between the inner surface of the thin middle portion 28 and the outer periphery of the downward extension 18 and a gap B between the outer surface of the middle portion 28 and the inner periphery of the upward extension 22).

Under such assembled or connected conditions, when the assembly is heated to a very high temperature, each element (reservoir 18, seal ring 24 and cylinder body 22) will expand independently.

Since the lower portion 27 and upper portion 29 of the seal ring 24 are in sealing engagement with the reservoir 11 and cylinder body 12, independent movement of the three components at the corresponding portions is prevented and accordingly, there will be thermal stresses set up due to the differential expansion.

However, since the middle thin portion 28 of the seal ring 24 and the corresponding connecting portions of the extensions 18 and 22 of the reservoir 11 and cylinder body 12 are separated with each other having gaps A and B, they are free to expand independently without generating any thermal stresses thereamong.

Thus according to the present invention, the total stresses induced upon the plastic reservoir may be reduced so as not to deform such plastic reservoir having a high thermal expansion coefficient, thus maintaining a completely fluid-tight connection between the reservoir and cylinder body by using a unique seal ring.

The sealing function will be made possible by the elasticity of the annular grooves 26, 30 provided at both ends of the seal ring. A plurality of linear projections 27a may be provided at the outer peripheral portion of the thick lower portion 27 of the seal ring 24 so that the contact area between the seal ring 24 and the connecting portions of the reservoir 11 and cylinder body 12 may be reduced.

Although the embodiment of this invention is provided with two gaps A and B, either one of them may be omitted in order to accomplish the objects of the present invention. Further, an annular shoulder 22a is provided at the upper end of the upward extension 22 to be engaged with the thick lower end 27 of the seal ring 24 so that the seal ring 24 may not be projected upwardly due to the fluid pressure in the master cylinder upon braking operation.

The other seal ring 25 and the attachment structure 21 will be readily understood from the foregoing detailed explanation of the seal ring 24 and the attachment structure 20, and therefore description thereof may be omitted.

Although the invention has thus been shown and described with reference to a specific embodiment, it should be noted that the invention is in no way limited to the details of the illustrated arrangements but changes and modifications may be made without departing from the scope of the appended claims.

What is claimed is:

1. An annular seal member sealingly interposed between and connecting coaxial, telescoped, cylindrical extensions of two members in substantially stationary relative position having different coefficients of thermal expansion, comprising:
   one resilient, bifurcated end portion in sealing contact with adjacent surfaces of said extensions of said two members, said one end portion having a plurality of linear projections spaced on the external walls thereof for reducing the contact area with said adjacent surfaces;
   a middle portion formed integral with and contiguous to said one end portion, said middle portion being normally separated from either one or both of the adjacent surfaces of said extensions of said two members, and
   another resilient, bifurcated end portion formed integral with and contiguous to said middle portion and in sealing contact with said adjacent surfaces of said extensions of said two members.

2. A seal member in accordance with claim 1 wherein one of said two members is a plastic reservoir while the other is a metal cylinder body, said plastic reservoir and said metal cylinder body being interconnected at least by said extensions to form a master cylinder assembly.

3. A fluid-flow connecting means for a cylinder body and a reservoir, comprising:
   a cylinrical downward extension depending from a lower wall of said reservoir for supplying fluid in said reservoir to said cylinder body,
   a cylindrical upward extension of an upper wall of said cylinder body coaxially receiving in spaced relationship said cylindrical downward extension of said reservoir for transmitting said fluid therethrough into said cylinder body, the adjacent wall of said upward extension having an annular channel forming a shoulder; and
   a resilient seal member interposed between adjacent walls of said cylindrical extensions for sealingly connecting said reservoir and said cylinder body, said seal member including one bifurcated end portion in sealing contact with the surfaces of said adjacent walls remote from said reservoir, a middle portion integral with said one end portion normally separated from either one of said adjacent walls, an annular shoulder on the outside surface of said seal member proximate said one end portion engaging said channel shoulder, and another bifurcated end portion integral with said middle portion in sealing contact with said surfaces of said adjacent walls proximate and reservoir.

4. A seal member in accordance with claim 3 wherein a plurality of linear projections are provided on the external walls of said one end portion for reducing the contact area between said adjacent surfaces and said one end portion.

5. An annular seal member sealing and connecting a cylindrical extension of a metal cylinder body with a cylindrical extension of a plastic reservoir, the reservoir extension being coaxial with the cylinder extension with adjacent walls of said extensions being in spaced relationship, the seal member comprising: a first bifurcated sealing portion disposed between said adjacent walls remote from said reservoir in sealing contact therewith and having a plurality of projections on the external walls thereof for reducing the contact area with said adjacent walls; a middle portion formed integrally with said first sealing portion disposed between and spaced from said adjacent walls and disposed between and spaced from a wall of said reservoir and said cylinder extension; and a second bifurcated sealing portion formed integrally with said middle portion and disposed between said wall of said reservoir and said cylinder extension in sealing contact therewith.

6. The seal member of claim 5 wherein an annular shoulder is formed in the external wall of said seal member proximate said first portion for engaging the adjacent wall of said cylinder extension.

* * * * *